(12) United States Patent
Lösch et al.

(10) Patent No.: US 8,013,087 B2
(45) Date of Patent: Sep. 6, 2011

(54) METHOD FOR THE PRODUCTION OF WATER ABSORBENT POLYMER PARTICLES BY POLYMERIZING DROPS OF A MONOMER SOLUTION

(75) Inventors: Dennis Lösch, Altrip (DE); Marco Krüger, Mannheim (DE); Achim Stammer, Freinsheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/443,554

(22) PCT Filed: Oct. 2, 2007

(86) PCT No.: PCT/EP2007/060418
§ 371 (c)(1),
(2), (4) Date: Mar. 30, 2009

(87) PCT Pub. No.: WO2008/040715
PCT Pub. Date: Apr. 10, 2008

(65) Prior Publication Data
US 2010/0010176 A1   Jan. 14, 2010

(30) Foreign Application Priority Data
Oct. 5, 2006   (EP) .................................... 06121840

(51) Int. Cl.
*C08F 20/06* (2006.01)
*C08F 2/00* (2006.01)
*B01J 20/22* (2006.01)
*B01J 20/26* (2006.01)

(52) U.S. Cl. ...................... 526/209; 526/930; 526/317.1; 502/401; 502/402

(58) Field of Classification Search .................... 526/88, 526/90
See application file for complete search history.

(56) References Cited

U.S. PATENT DOCUMENTS

| | | | |
|---|---|---|---|
| 5,269,980 A | 12/1993 | Levendis et al. | |
| 5,567,478 A * | 10/1996 | Houben et al. | 427/342 |
| 2002/0193546 A1 * | 12/2002 | Freeman et al. | 526/310 |
| 2006/0217508 A1 * | 9/2006 | Schmid et al. | 526/317.1 |
| 2007/0100115 A1 | 5/2007 | Schmid et al. | |
| 2008/0188586 A1 * | 8/2008 | Bruhns et al. | 522/153 |
| 2008/0188821 A1 | 8/2008 | Losch et al. | |
| 2009/0192035 A1 | 7/2009 | Stueven et al. | |
| 2009/0258994 A1 | 10/2009 | Stueven et al. | |

FOREIGN PATENT DOCUMENTS

| | | |
|---|---|---|
| DE | 103 14 466 A1 | 10/2004 |
| DE | 103 40 253 A1 | 3/2005 |
| DE | 10 2004 024 437 A1 | 12/2005 |
| EP | 348 180 A2 | 12/1989 |
| JP | 05132503 A | 5/1993 |
| WO | WO-96/40427 A1 | 12/1996 |
| WO | WO-2005/111088 A1 | 11/2005 |
| WO | WO-2006/077054 A1 | 7/2006 |
| WO | WO 2006/079631 A1 * | 8/2006 |
| WO | WO-2006/079631 A1 | 8/2006 |
| WO | WO 2006079631 A1 * | 8/2006 |
| WO | WO-2006/120232 A1 | 11/2006 |
| WO | WO-2007/093531 A1 | 8/2007 |
| WO | WO-2008/009580 A1 | 1/2008 |
| WO | WO-2008/009598 A1 | 1/2008 |
| WO | WO-2008/009611 A1 | 1/2008 |
| WO | WO-2008/009612 A1 | 1/2008 |

OTHER PUBLICATIONS

Buchholz et al., *Modern Superabsorbent Polymer Technology*, Wiley-VCH, 71-103 (1998).
International Search Report and Written Opinion in PCT/EP2007/060418 filed Apr. 2, 2008.

* cited by examiner

*Primary Examiner* — David Wu
*Assistant Examiner* — Elizabeth Eng
(74) *Attorney, Agent, or Firm* — Marshall, Gerstein & Borun LLP

(57) ABSTRACT

A process for preparing water-absorbing polymer beads by polymerizing droplets of a monomer solution in a gas phase surrounding the droplets, the initiator being added to the monomer solution from 0.5 to 60 seconds before the droplets are generated.

14 Claims, No Drawings

METHOD FOR THE PRODUCTION OF WATER ABSORBENT POLYMER PARTICLES BY POLYMERIZING DROPS OF A MONOMER SOLUTION

CROSS-REFERENCE TO RELATED APPLICATIONS

This is the U.S. national phase of International Application No. PCT/EP2007/060418, filed Oct. 2, 2007, which claims the benefit of European Patent Application No. 06121840.0, filed Oct. 5, 2006.

The present invention relates to a process for preparing water-absorbing polymer beads by polymerizing droplets of a monomer solution, in a gas phase surrounding the droplets, the initiator being added to the monomer solution from 0.5 to 60 seconds before the droplets are generated.

The preparation of water-absorbing polymer beads is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening.

Spray polymerization allows the process steps of polymerization and drying to be combined. In addition, the bead size can be set within certain limits by virtue of suitable process control.

The preparation of water-absorbing polymer beads by polymerization of droplets of a monomer solution is described, for example, in EP 348 180 A1, WO 96/40427 A1, U.S. Pat. No. 5,269,980, DE 103 14 466 A1, DE 103 40 253 A1 and DE 10 2004 024 437 A1, WO 2006/077054 A1, and also the prior German application 102006001596.7 and the prior PCT application PCT/EP2006/062252.

JP 05/132503 A discloses a spray polymerization process in which the polymerization is initiated by a redox initiator. In this process, a monomer solution comprising a reducing agent is metered in together with a further monomer solution comprising an oxidizing agent such that the monomer solutions do not mix until outside the spray nozzle.

It was an object of the present invention to provide an improved process for preparing water-absorbing polymer beads by polymerizing droplets of a monomer solution in a gas phase surrounding the droplets.

In particular, it was an object of the present invention to provide a process which is relatively unlikely to be affected by faults and simultaneously generates qualitatively high-value products.

The object is achieved by a process for preparing water-absorbing polymer beads by polymerizing droplets comprising
a) at least one ethylenically unsaturated monomer,
b) at least one crosslinker,
c) at least one initiator,
d) water,
in a gas phase surrounding the droplets, which comprises adding the initiator c) to the monomer solution from 0.5 to 60 seconds before the droplets are generated.

Typically, monomer a), crosslinker b) and water d) are premixed. The time from the addition of the initiator c) until the generation of the droplets is the mean residence time of the monomer solution from the time at which the initiator c) is added up to the time at which the monomer solution enters the reaction chamber with formation of droplets. The residence time can be determined via the available volume and the throughput.

The initiator c) is added to the monomer solution preferably from 0.8 to 45 seconds, more preferably from 1 to 30 seconds, most preferably from 1.2 to 15 seconds, before the droplets are generated.

Preference is given to using a static mixer as the mixer.

The droplets obtained have a mean diameter of preferably at least 200 µm, more preferably of at least 250 µm, most preferably of at least 300 µm, the droplet diameter being determinable by light scattering and meaning the volume-average mean diameter.

The droplets are preferably monodisperse; more preferably, less than 10% by weight of the droplets have a diameter which deviates by more than 50% from the mean diameter.

The water-absorbing polymer beads obtainable by the process according to the invention have a centrifuge retention capacity (CRC) of typically at least 20 g/g, preferably at least 25 g/g, preferentially at least 30 g/g, more preferably at least 32 g/g, most preferably at least 34 g/g. The centrifuge retention capacity (CRC) of the water-absorbing polymer beads is typically less than 50 g/g.

The water-absorbing polymer beads obtainable by the process according to the invention have a content of extractables of typically less than 15% by weight, preferably less than 10% by weight, preferentially less than 5% by weight, more preferably less than 4% by weight, most preferably less than 3% by weight.

The water-absorbing polymer beads obtainable by the process according to the invention have a content of residual monomers of typically less than 15% by weight, preferably less than 10% by weight, preferentially less than 5% by weight, more preferably less than 4% by weight, most preferably less than 3% by weight.

The water-absorbing polymer beads obtainable by the process according to the invention have a ratio of centrifuge retention capacity (CRC) to extractables of typically at least 5, preferably at least 6, preferentially at least 7, more preferably at least 8, most preferably at least 8.5. The ratio is the quotient of centrifuge retention capacity (CRC) in g/g and the content of extractables in % by weight.

The water-absorbing polymer beads obtainable by the process according to the invention have a ratio of centrifuge retention capacity (CRC) to residual monomers of typically at least 50, preferably at least 75, preferentially at least 100, more preferably at least 125, most preferably at least 150. The ratio is the quotient of centrifuge retention capacity (CRC) in g/g and the content of residual monomers in % by weight.

The mean diameter of the water-absorbing polymer beads obtainable by the process according to the invention is preferably at least 200 µm, more preferably from 250 to 600 µm, very particularly from 300 to 500 µm, the bead diameter being determinable by light scattering and meaning the volume-average mean diameter. 90% of the polymer beads have a diameter of preferably from 100 to 800 µm, more preferably from 150 to 700 µm, most preferably from 200 to 600 µm.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably being at least partly neutralized.

The proportion of acrylic acid and/or salts thereof in the total amount of monomers a) is preferably at least 50 mol %, more preferably at least 90 mol %, most preferably at least 95 mol %.

The acid groups of the monomers a) are typically partly neutralized, preferably to an extent of from 25 to 85 mol %, preferentially to an extent of from 50 to 80 mol %, more preferably from 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred as alkali metals, but very particular preference is given to sodium hydroxide, sodium carbonate or sodium hydrogencarbonate, and mixtures thereof. Typically, the neutralization is achieved by mixing in the neutralizing agent as an aqueous solution, as a melt or preferably also as a solid. For example, sodium hydroxide with a water content significantly below 50% by weight may be present as a waxy material having a melting point above 23° C. In this case, metered addition as piece material or melt at elevated temperature is possible.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula

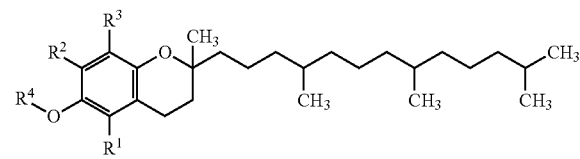

where $R^1$ is hydrogen or methyl, $R^2$ is hydrogen or methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3=$methyl, in particular racemic alpha-tocopherol. $R^1$ is more preferably hydrogen or acetyl. RRR-alpha-tocopherol is especially preferred.

The monomer solution comprises preferably at most 160 ppm by weight, preferentially at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

Crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example in WO 2003/104301 A1. Di- and/or triacrylates of 3- to 10-tuply ethoxylated glycerol are particularly advantageous.

Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The monomer solution comprises preferably at least 0.2% by weight, preferentially at least 0.4% by weight, more preferably at least 0.6% by weight, most preferably at least 0.8% by weight, of crosslinker b), based in each case on monomer a).

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)phenyl]-2-hydroxy-2-methyl-1-propan-1-one, and mixtures thereof.

The initiators are used in customary amounts, for example in amounts of from 0.001 to 5% by weight, preferably from 0.01 to 1% by weight, based on the monomers a).

The polymerization inhibitors can also be removed by absorption, for example on activated carbon.

The solids content of the monomer solution is preferably at least 35% by weight, preferably at least 38% by weight, more preferably at least 40% by weight, most preferably at least 42% by weight. The solids content is the sum of all constituents which are involatile after the polymerization. These are monomer a), crosslinker b) and initiator c).

The oxygen content of the monomer solution is preferably at least 1 ppm by weight, more preferably at least 2 ppm by weight, more preferably at least 5 ppm by weight. It is therefore possible to largely dispense with the customary inertization of the monomer solution.

The increased oxygen content stabilizes the monomer solution and enables the use of smaller amounts of polymerization inhibitor and hence reduces the product discolorations caused by the polymerization inhibitor.

The monomer solution is metered into the gas phase for polymerization. The oxygen content of the gas phase is preferably from 0.001 to 0.15% by volume, more preferably from 0.002 to 0.1% by volume, most preferably from 0.005 to 0.05% by volume.

As well as oxygen, the gas phase preferably comprises only inert gases, i.e. gases which, under reaction conditions, do not intervene in the polymerization, for example nitrogen and/or steam.

The monomer solution is metered into the gas phase to form droplets. The droplets can be generated, for example, by means of a dropletizer plate.

A dropletizer plate is a plate having at least one bore, the liquid entering the bore from the top. The dropletizer plate or the liquid can be oscillated, which generates a chain of ideally monodisperse droplets at each bore on the underside of the dropletizer plate. In a preferred embodiment, the dropletizer plate is not agitated.

The number and size of the bores are selected according to the desired capacity and droplet size. The droplet diameter is typically 1.9 times the diameter of the bore. What is important here is that the liquid to be dropletized does not pass through the bore too rapidly and the pressure drop over the bore is not too great. Otherwise, the liquid is not dropletized, but rather the liquid jet is broken up (sprayed) owing to the high kinetic energy. The dropletizer is operated in the flow range of laminar jet decomposition, i.e. the Reynolds number based on the throughput per bore and the bore diameter is preferably less than 2000, preferentially less than 1000, more preferably less than 500 and most preferably less than 100. The pressure drop through the bore is preferably less than 2.5 bar, more preferably less than 1.5 bar and most preferably less than 1 bar.

The dropletizer plate has typically at least one bore, preferably at least 10, more preferably at least 50 and typically up to 10 000 bores, preferably up to 5000, more preferably up to 1000 bores, the bores typically being distributed uniformly over the dropletizer plate, preferably in so-called triangular pitch, i.e. three bores in each case form the corners of an equilateral triangle. The diameter of the bores is adjusted to the desired droplet size.

However, the droplets can also be generated by means of pneumatic drawing dies, rotation, cutting of a jet or rapidly actuable microvalve dies.

In a pneumatic drawing die, a liquid jet together with a gas stream is accelerated through a diaphragm. The gas rate can be used to influence the diameter of the liquid jet and hence the droplet diameter.

In the case of droplet generation by rotation, the liquid passes through the orifices of a rotating disk. As a result of the centrifugal force acting on the liquid, droplets of defined size are torn off. Preferred apparatus for rotary dropletization are described, for example, in DE 43 08 842 A1.

The emerging liquid jet can also be cut into defined segments by means of a rotating blade. Each segment then forms a droplet.

In the case of use of microvalve dies, droplets with defined liquid volume are generated directly.

The gas phase preferably flows as carrier gas through the reaction chamber. The carrier gas can be conducted through the reaction chamber in cocurrent or in countercurrent to the free-falling droplets of the monomer solution, preferably in cocurrent. After one pass, the carrier gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The polymerization is preferably carried out in a laminar gas flow. A laminar gas flow is a gas flow in which the individual layers of the flow do not mix but rather move in parallel. A measure of the flow conditions is the Reynolds number (Re). Below a critical Reynolds number ($Re_{crit}$) of 2300, the gas flow is laminar. The Reynolds number of the laminar gas flow is preferably less than 2000, more preferably less than 1500 and most preferably less than 1000. The lower limiting case of the laminar inert gas flow is a standing inert gas atmosphere (Re=0), i.e. inert gas is not fed in continuously.

The gas velocity is preferably adjusted such that the flow in the reactor is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The carrier gas is appropriately preheated to the reaction temperature upstream of the reactor.

The reaction temperature in the thermally induced polymerization is preferably from 70 to 250° C., more preferably from 100 to 220° C. and most preferably from 120 to 200° C.

The reaction can be carried out under elevated pressure or under reduced pressure; preference is given to a reduced pressure of up to 100 mbar relative to ambient pressure.

The reaction offgas, i.e. the carrier gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh carrier gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The reaction product can be withdrawn from the reactor in a customary manner, preferably at the bottom by means of a conveying screw, and, if appropriate, dried down to the desired residual moisture content and to the desired residual monomer content.

The polymer beads can subsequently be postcrosslinked for further improvement of the properties.

Postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols as described in DE 33 14 019 A1, DE 35 23 617 A1 and EP 450 922 A2, or β-hydroxyalkylamides, as described in DE 102 04 938 A1 and U.S. Pat. No. 6,239,230.

In addition, DE 40 20 780 C1 describes cyclic carbonates, DE 198 07 502 A1 describes 2-oxazolidone and its derivatives such as 2-hydroxyethyl-2-oxazolidone, DE 198 07 992 C1 describes bis- and poly-2-oxazolidinones, DE 198 54 573 A1 describes 2-oxotetrahydro-1,3-oxazine and its derivatives, DE 198 54 574 A1 describes N-acyl-2-oxazolidones, DE 102 04 937 A1 describes cyclic ureas, DE 103 34 584 A1 describes bicyclic amide acetals, EP 1 199 327 A2 describes oxetanes and cyclic ureas, and WO 2003/31482 A1 describes morpholine-2,3-dione and its derivatives, as suitable postcrosslinkers.

The amount of postcrosslinker is preferably from 0.01 to 1% by weight, more preferably from 0.05 to 0.5% by weight, most preferably from 0.1 to 0.2% by weight, based in each case on the polymer.

The postcrosslinking is typically performed in such a way that a solution of the postcrosslinker is sprayed onto the hydrogel or the dry polymer beads. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 170 to 250° C., preferably from 180 to 220° C. and more preferably from 190 to 210° C. The preferred residence time at this temperature in the reaction mixer or dryer is preferably at least 10 minutes, more preferably at least 20 minutes, most preferably at least 30 minutes.

The process according to the invention enables the preparation of water-absorbing polymer beads with a high centrifuge retention capacity (CRC), a low level of extractables and a low level of residual monomers.

The water-absorbing polymer beads are tested by means of the test methods described below.

Methods:

Residual Monomers

The residual monomers of the water-absorbing polymer beads are determined by the EDANA (European Disposables and Nonwovens Association) recommended test method No. 410.2-02 "Residual monomers".

Centrifuge Retention Capacity (CRC)

The centrifuge retention capacity of the water-absorbing polymer beads is determined by the EDANA (European Disposables and Nonwovens Association) recommended test method No. 441.2-02 "Centrifuge retention capacity".

Extractables

The content of extractables of the water-absorbing polymer beads is determined by the EDANA (European Disposables and Nonwovens Association) recommended test method No. 470.2-02 "Extractable".

The EDANA test methods are obtainable, for example, from the European Disposables and Nonwovens Association, Avenue Eugène Plasky 157, B-1030 Brussels, Belgium.

EXAMPLES

Example 1

14.3 kg of sodium acrylate (37.5% by weight solution in water), 1.4 kg of acrylic acid and 350 g of water were mixed with 22 g of 15-tuply ethoxylated trimethylolpropane triacrylate. The solution was dropletized into a heated dropletizer tower filled with a nitrogen atmosphere (180° C., height 12 m, width 2 m, gas velocity 0.1 m/s in cocurrent). The metering rate of the monomer solution was 32 kg/h; the temperature of the monomer solution was 25° C. The dropletizer plate had 60×200 μm bores. The dropletizer had an internal diameter of 40 mm and an internal height of 2 mm. Upstream of the dropletizer, the initiator was metered into the monomer solution by means of static mixers. The initiator used was a 3% by weight solution of 2,2'-azobis[2-(2-imidazolin-2-yl)propane] dihydrochloride in water. The metering rate of the initiator solution was 2.2 kg/h; the temperature of the initiator solution was 25° C. Mixer and dropletizer were connected directly to one another.

The test results are summarized in Table 1.

Examples 2 to 4

14.3 kg of sodium acrylate (37.5% by weight solution in water), 1.4 kg of acrylic acid and 350 g of water were mixed with 22 g of 15-tuply ethoxylated trimethylolpropane triacrylate. The solution was dropletized into a heated dropletizer tower filled with nitrogen atmosphere (180° C., height 12 m, width 2 m, gas velocity 0.1 m/s in cocurrent). The metering rate of the monomer solution was 16 kg/h; the temperature of the monomer solution was 25° C. The dropletizer plate had 30×200 μm bores. The dropletizer had an internal diameter of 40 mm and an internal height of 2 mm. Upstream of the dropletizer, the initiator was metered into the monomer solution by means of static mixers. The initiator used was a 3% by weight solution of 2,2'-azobis[2-(2-imidazolin-2-yl)propane] dihydrochloride in water. The metering rate of the initiator solution was 1.1 kg/h; the temperature of the initiator solution was 25° C. The residence time between initiator addition and droplet generation was adjusted via the length of the pipeline between mixer and dropletizer.

The test results are summarized in Table 1.

TABLE 1

Test results

| Example | Residence time | CRC/extractables | CRC/residual monomers | Pressure drop rise by 50% |
|---|---|---|---|---|
| 1*) | 0.3 s | 4.5 | 36 | 30 h |
| 2 | 0.5 s | 8.2 | 144 | 25 h |
| 3 | 1.5 s | 8.6 | 173 | 20 h |
| 4') | 110 s | 8.8 | 175 | 4 h |

*)comparative example

The invention claimed is:

1. A process for preparing water-absorbing polymer beads by polymerizing droplets of a monomer solution comprising
   a) at least one ethylenically unsaturated monomer,
   b) at least one crosslinker,
   c) at least one initiator,
   d) water,
in a gas phase surrounding the droplets, which have a mean diameter of at least 200 µm, which comprises adding the initiator c) to the monomer solution from 0.5 to 30 seconds before the droplets are generated.

2. The process according to claim 1, wherein the initiator is added upstream of a static mixer.

3. The process according to claim 1, wherein an oxygen content of the monomer solution is at least 1 ppm by weight.

4. The process according to claim 1, wherein the monomer solution comprises less than 160 ppm by weight, based on the ethylenically unsaturated monomer a), of a polymerization inhibitor.

5. The process according to claim 4, wherein the polymerization inhibitor is hydroquinone monomethyl ether.

6. The process according to claim 1, wherein the monomer a) has at least one acid group.

7. The process according to claim 6, wherein the acid groups of the monomer a) have been at least partly neutralized.

8. The process according to claim 1, wherein the monomer a) is acrylic acid to an extent of at least 50 mol %.

9. The process according to claim 1, wherein the resulting polymer beads are dried and/or postcrosslinked in at least one further process step.

10. The process according to claim 1, wherein the droplets of the monomer are monodisperse.

11. The process according to claim 10, wherein the monodisperse droplets are formed by means of a dropletizer plate.

12. The process according to claim 1, wherein the droplets of the monomer solution are polymerized in a laminar gas flow.

13. The process according to claim 1, wherein the droplets have a mean diameter of at least 200 µm to 600 µm.

14. The process according to claim 1, wherein the initiator c) is added to the monomer solution from 0.5 to 15 seconds before the droplets are generated.

* * * * *